J. Phelps
Pulp Washing.
No. 196. Reissued Mar. 25, 1851.
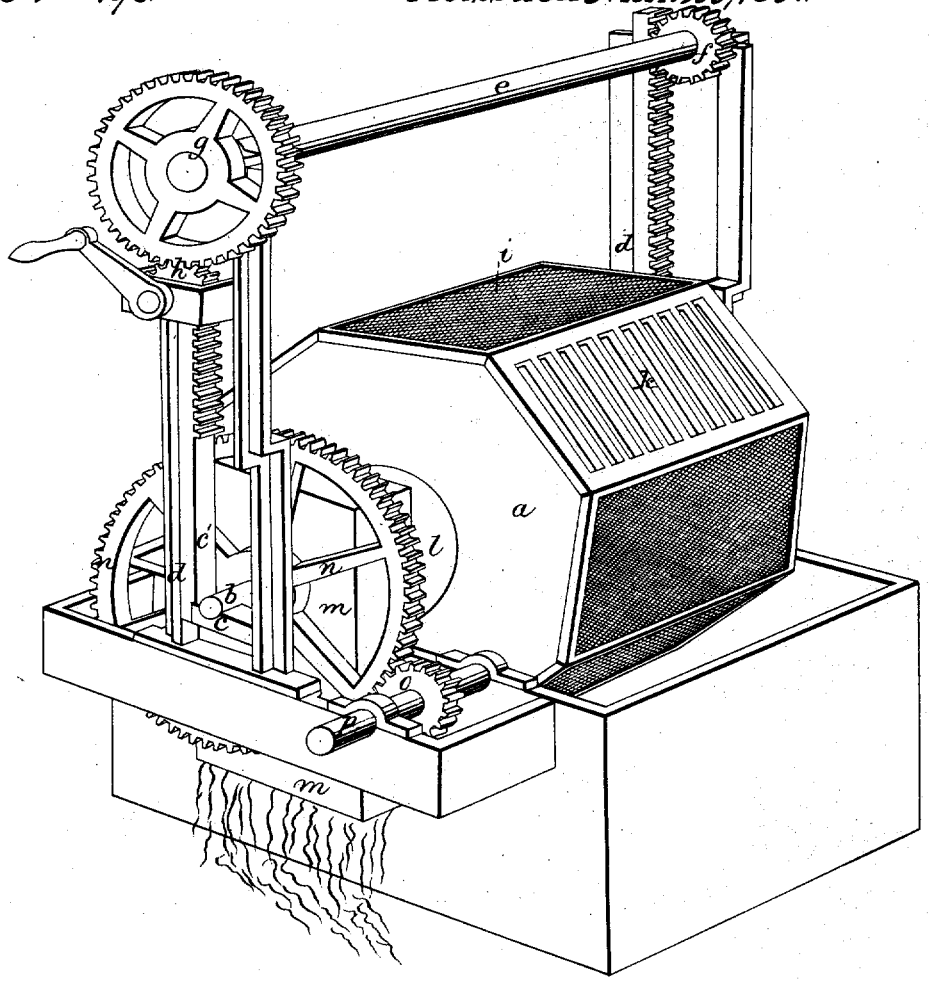
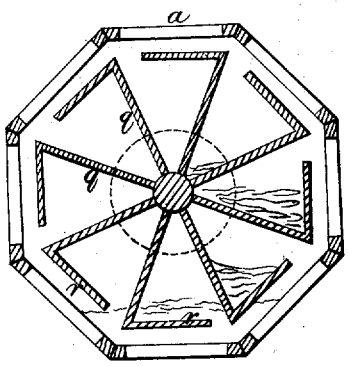
N. PETERS, PHOTO-LITHOGRAPHER, WASHINGTON, D. C.

UNITED STATES PATENT OFFICE.

JAMES PHELPS, OF WEST SUTTON, MASSACHUSETTS.

IMPROVEMENT IN MACHINES FOR CLEANING PAPER-RAGS.

Specification forming part of Letters Patent No. 3,354, dated November 24, 1843; Reissue No. 196, dated March 25, 1851.

*To all whom it may concern:*

Be it known that I, JAMES PHELPS, of West Sutton, in the county of Worcester and State of Massachusetts, have invented certain new and useful improvements in Engines for Washing and Beating Rags and other Paper Stock in the Manufacture of Paper; and I do hereby declare that the following is a full, clear, and exact description of my invention, reference being had to the accompanying drawing, which forms part of this specification, and in which the figures represent, respectively, a view in perspective of my adjustable rotating water elevator and strainer and a vertical section through the same.

In the process of washing and beating rags and other paper stock, the dirty water is strained from the paper stock and removed from the engine, its place being supplied by fresh water. In order to render the process continuous, the fresh water is supplied in a constant stream, while the dirty water must be removed as fast as the fresh water enters to prevent the overflowing of the vat or tub of the washing-engine. The quantity of water supplied varies at different stages of the operation, and it is expedient that the water in the vat should always stand at the same level; hence it becomes necessary to devise some means for removing the water, which, while acting continuously, shall be capable of adjustment to vary the discharge of water according to the quantity supplied. An apparatus for this purpose should be also constructed in such manner that it can readily be withdrawn from the vat of the engine to admit of the stirring up of the stock in the process of beating, or for other purposes. An apparatus for removing the water from engines for washing rags and other paper stock should not only effect this purpose in the manner above stated, but should also prevent the rags or other paper stock from passing off with the dirty water. While effecting this duty the apparatus should be so constructed as to clear itself as much as possible from adhering fibers that would choke it and impede its action; and, as that portion of the apparatus which effects the straining is subject to derangement, it should be constructed in such manner that repairs can be made with facility and dispatch.

The object of my invention is to supply these requisites more effectually than has heretofore been done, and it consists in combining with the vat or tub of an engine for washing and beating rags and other paper stock, a rotating water elevator and strainer constructed and arranged in such manner that it can be readily depressed or raised to vary its dip in the vat, or can be raised entirely therefrom, as may be found necessary to vary or suspend the discharge of water. This water elevator and strainer consists of a series of scoops inclosed in a polygonal or prismatic screen which allows the water to pass freely through it to the scoops, but prevents the passage of the paper stock, while the sides of the screen, in their revolution produce an agitation of the water which favors the detachment of the fibers of the paper stock from its meshes, thus rendering it less liable to become clogged and obstructed than a cylindrical screen.

The rotating water elevator and strainer, represented in the accompanying drawing, has the form of an octagonal drum, *a*, secured to a shaft, *b*, whose journals are supported in suitable boxes, *c*. One of the heads of this drum has a short cylindrical pipe, *l*, secured to it, which enters a box-spout, *m*, at the side of the vat of the engine. The faces of the drum are formed of bars *k*, over which a sheet of wire-gauze *i* is secured. The interior of the drum is fitted with a series of scoops, *q r*, which, as it is rotated, scoop up the water in which they dip and discharge it through the lateral pipe *l*, secured to the head. The boxes *c*, which sustain the journals of the shaft of the water elevator and strainer, are constructed to slide in standards *d d* erected at each side of the trough of the vat in which it dips. Each of these boxes is secured to the lower extremity of a rack-bar, C′, whose teeth engage with those of a corresponding pinion, *f*, on a shaft, *e*, above. The pinions of the two racks are equal, so that as the pinion-shaft *e* is turned in one direction or the other the two boxes, with the water elevator and strainer, are equally raised or lowered, as may be required. In order to facilitate the turning of the pinion-shaft, it is fitted at one extremity with a cog-wheel, *g*, whose teeth engage with those of a corresponding pinion, *h*, on a shaft which is fitted with a crank, to which the attendant applies his hand. When the water elevator and strainer has been set in any suitable position, it is easily secured in place by simply inserting a block of wood between the teeth of the wheel *g* and pinion *h*, to prevent their turning by the weight of the apparatus. The shaft of the water elevator and strainer has a cog-wheel, *n*, secured to it, whose teeth engage with those of a pinion, *o*, on a short counter-shaft, *p*; the latter is caused to revolve by means of some suitable device which imparts motion to it from any available prime mover. As one, *n*, at least of the wheels is of large diameter, and as their teeth are constructed with a considerable play or clearance, the water elevator and strainer may be raised or lowered to vary the dip of the scoops sufficiently to discharge the least or greatest quantity of water required without the teeth of these wheels being drawn out of gear with each other. When the rags are first submitted to the action of the washing-engine, they are generally in a very filthy condition, and consequently river or other impure water can be used until the rags arrive at a comparatively clean state. As such water can generally be procured in abundance, it is customary to supply the water freely during the first stages of the operation, while it must be removed as fast as it is supplied in order to prevent the overflow of the vat of the engine. At this stage of the operation, therefore, the water elevator and strainer is lowered by turning the crank until its periphery dips so deeply into the vat that the scoops shall dip up and discharge the requisite quantity of water. As the operation progresses the water supplied must be purer, and as an unlimited supply of pure water cannot always be obtained without great expense, it is customary to supply it in limited quantities. As the supply of water decreases the quantity withdrawn by the apparatus must be diminished in a corresponding degree, which is readily effected by raising the water elevator and strainer by turning the crank until the quantity of water discharged by the scoops is suitably reduced. When the paper stock has been sufficiently washed, or when it is desirable to stop the supply and discharge of water, the water elevator and strainer is readily raised from the vat by turning the crank so that that portion of the vat beneath it can be readily got at for the stirring up of the pulp, or for any other purpose.

While this adjustable apparatus is thus adapted to the varying circumstances which occur at different stages of the operation, it is less liable than it would be if its form was cylindrical to have the meshes of the screen clogged, for the swash produced by the rotation of the prismatic strainer is continually acting to dash away the fibers from its meshes and leave them free for the passage of the water. The method herein described of constructing the apparatus with a prismatic periphery is also advantageous, from the fact that it enables the constructor to cover each face with a separate sheet of gauze, which, being of small size, can be readily removed when accidentally broken, and can be as readily replaced by a new sheet at a much less cost than would be required if the periphery was cylindrical and covered with a continuous sheet of gauze.

What I claim as my invention, and desire to secure by Letters Patent, is—

1. An adjustable rotating water elevator and strainer arranged, substantially as herein set forth, in such manner that it can be raised or lowered in the vat of the washing or beating engine to vary the quantity of water discharged therefrom, or can be raised entirely from the vat to stop the discharge of water, or for other purposes, as herein set forth.

2. A rotating prismatic screen or strainer for straining the water from the paper stock in the vat of a washing or beating engine, in combination with devices for discharging the strained water, the prismatic screen being not only more efficient than a cylindrical screen, but also admitting of more ready repair.

In testimony whereof I have hereunto subscribed my name.

JAMES PHELPS.

Witnesses:
LEWIS C. STONE,
STEPHEN DAVIS.